Aug. 11, 1959   D. R. HELBLE   2,898,811
MOUNT FOR ROTATABLE MULTIPLE-BARREL-GUN
Filed Sept. 4, 1956   4 Sheets-Sheet 1
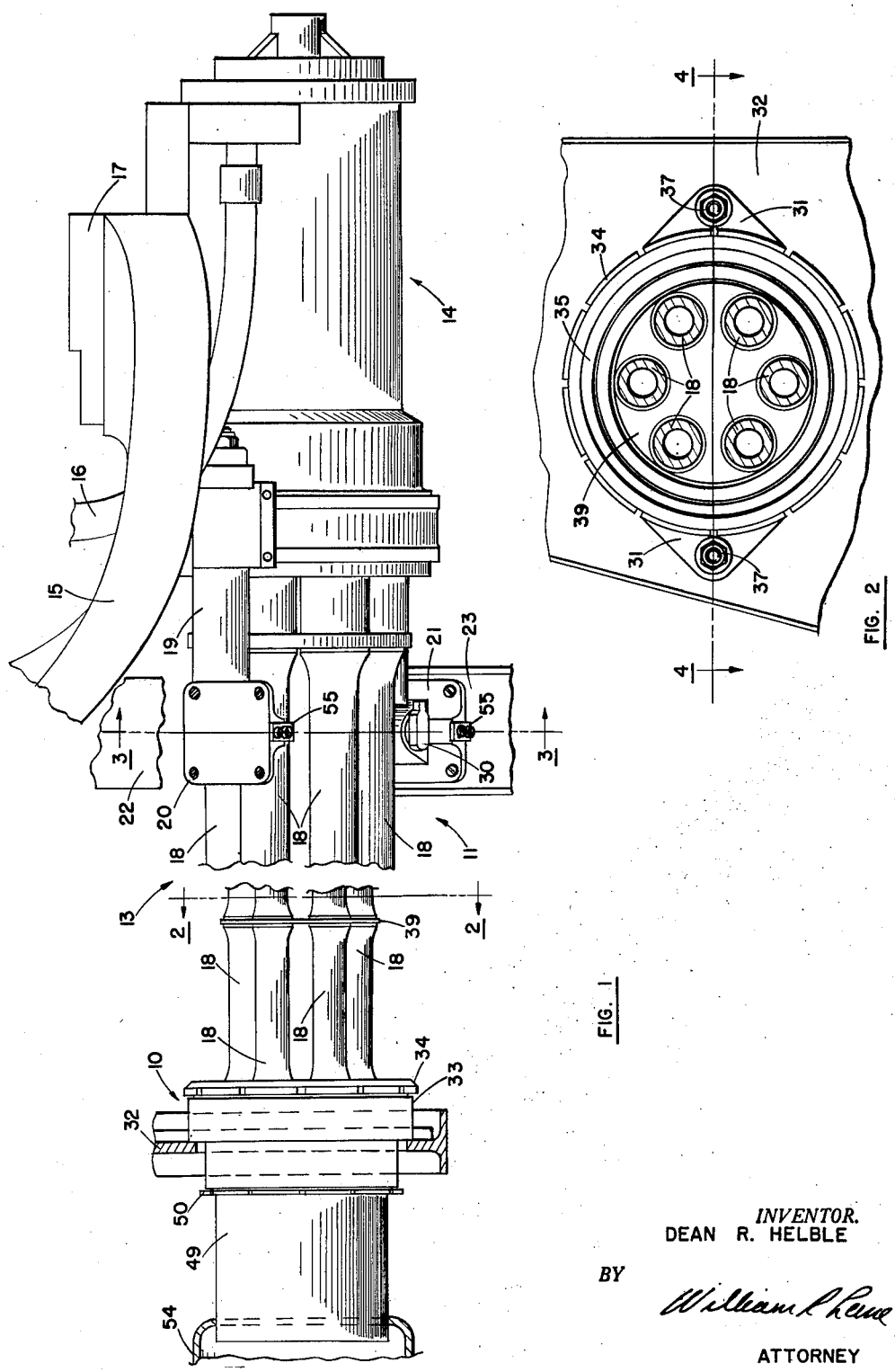
INVENTOR.
DEAN R. HELBLE
BY
ATTORNEY

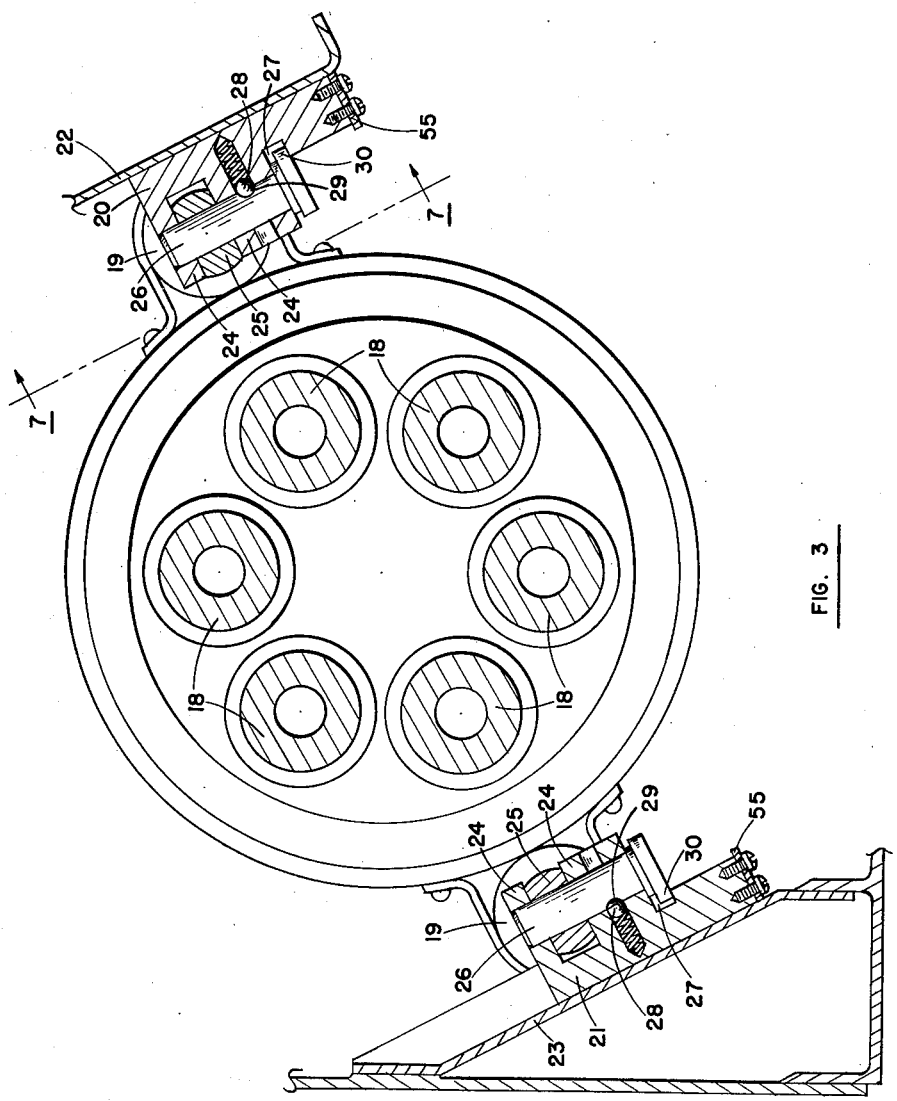

INVENTOR.
DEAN R. HELBLE

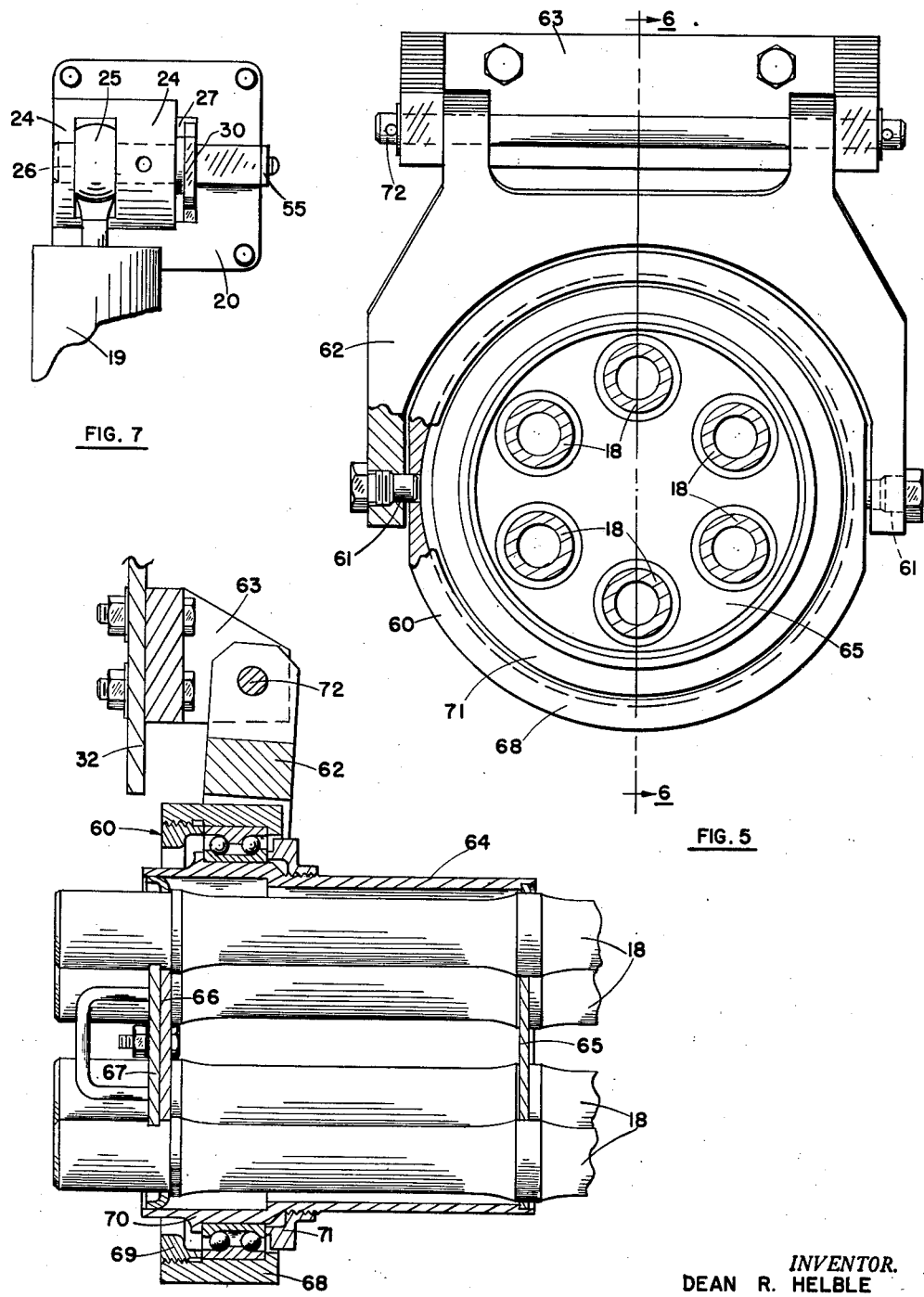

United States Patent Office 2,898,811
Patented Aug. 11, 1959

2,898,811

MOUNT FOR ROTATABLE MULTIPLE-BARREL-GUN

Dean R. Helble, Hawthorne, Calif., assignor to North American Aviation, Inc.

Application September 4, 1956, Serial No. 607,880

11 Claims. (Cl. 89—37)

This invention relates to a gun installation of the fixed type and particularly to a means for supporting a rotatable multiple-barrel-gun of the high-cyclic-rate-of-fire type.

Accordingly, it is an object of this invention to provide a simple device for supporting the forward end of a rotatable multiple-barrel-gun.

It is also an object of this invention to provide a rotatable multiple-barrel-gun mount characterized by the ease and facility with which the gun may be detached from the mount.

It is another object of this invention to improve the accuracy of a rotatable multiple-barrel-gun.

It is still a further object of this invention to provide a rotatable support for the barrels of a multiple-barrel-gun that is capable of resisting the dynamic firing loads imposed thereon.

A still further object of the invention is to provide a rotatable support for the rotatable barrels of a multiple-barrel-gun and a quickly releasable detent means for securing the non-rotatable breech portion of the gun.

These and other objects and advantages of this invention will become more apparent when read in the light of the accompanying drawings and specification wherein:

Fig. 1 is a side elevational view of a rotatable multiple-barrel-gun mounted in firing position by the mounting devices of this invention including a portion of the supporting structure.

Fig. 2 is a transverse sectional view taken in the plane of line 2—2 in Fig. 1 looking towards the muzzle of the gun.

Fig. 3 is a transverse sectional view taken through the fixed rear mount in the plane of line 3—3 in Fig. 1 looking towards the breech of the gun.

Fig. 5 is a transverse view, taken in the plane of line 2—2 in Fig. 1, partly in section and partly in elevation, showing a modified form of mounting for the rotatable muzzle mount.

Fig. 6 is a longitudinal sectional view of the modified form of muzzle mount, taken in the plane of line 6—6 of Fig. 5.

Fig. 7 is an elevational view of one of the fixed rear mounts taken in the plane of line 7—7 in Fig. 3.

Figure 4:
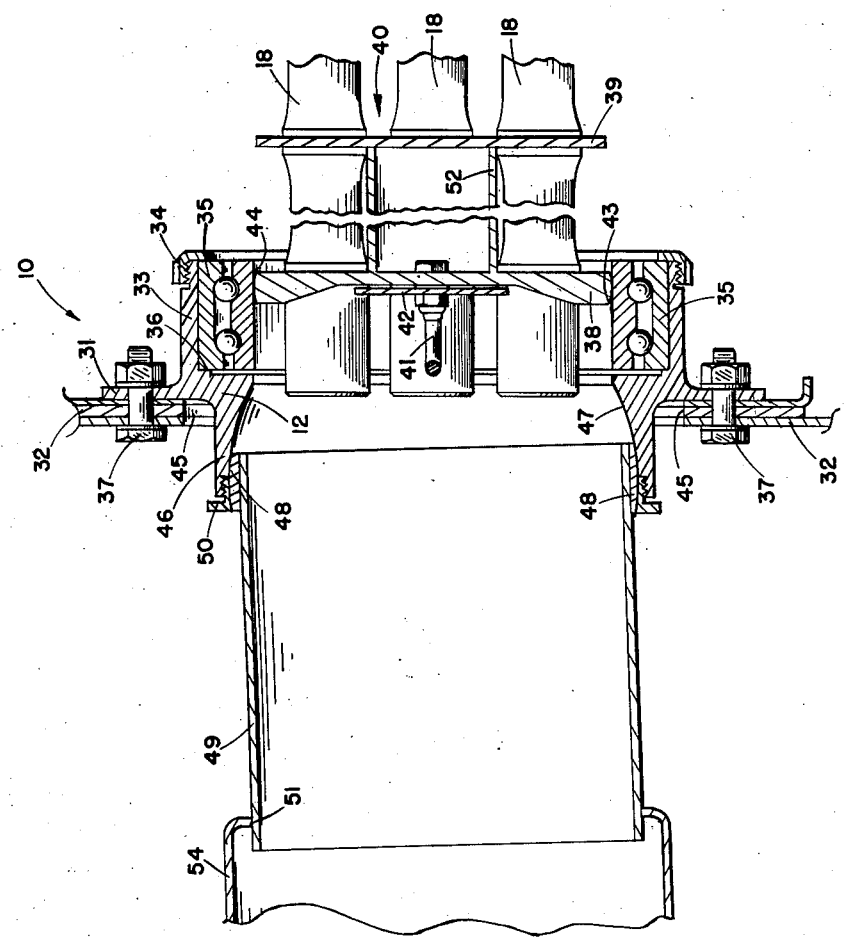
Fig. 4 is a view taken in the plane of line 4—4 of Fig. 2, partly in section, partly in elevation, of the rotating muzzle mount of this invention.

Although the inventive concept is disclosed and illustrated herein as applied to an aircraft, it is equally applicable for use on any other type of movable gun platform wherein the platform itself is aimed at the target. Additionally by providing a suitable type of universally movable support for the rotatable bearing element of this invention, for example a support such as a spherical or ball and socket joint of the type well within the skill of the art, the application of the rotatable front mount of this invention could be greatly extended.

Referring specifically to the drawings wherein like reference characters have been used throughout the several views to designate like parts and referring at first to Fig. 1, reference numeral 10 designates the rotatable muzzle mount generally while reference numeral 11 generally designates the fixed mount supporting the non-rotatable rear portion of the gun 13. The gun herein is of the high-cyclic-rate-of-fire type having a plurality of barrels 18 which are sequentially loaded, rotated and fired one at a time by the hydraulic motor-driven breech mechanism indicated generally at 14, with ammunition feed chute 15 attached to the stripping chamber 17 thereof. Flexible ammunition-feed drive-shaft 16 is driven by the gun-driving mechanism 14 and may be used for motivating belt feed-sprockets or an ammunition drum.

The mechanism for feeding, firing and controlling the firing of the gun forms no part of the present invention and hence is not illustrated or described in detail.

The non-rotating breech portion of the gun is attached to the fixed mount 11 by means of longitudinally extending recoil members 19, mounted one on each side of the gun. The fixed rear mount includes oppositely disposed support members 20 and 21 which are bolted or otherwise rigidly secured to fixed portions 22 and 23 respectively of the aircraft structure. Support members 20, 21 each include a bifurcated section which receives the apertured rod end 25 of a recoil member 19. As best shown in Fig. 3, the legs 24 of the bifurcated portion of each support member 20, 21 are apertured for the reception of a locking pin 26 which is also adapted for insertion through the aperture in the recoil unit rod end or lug 25 when the latter is inserted within the bifurcated portion of the support member with the adjoining apertures in registry. The head of pin 26 includes a locking lug 30 adapted to be turned to fit within a groove 27 in the support member 20 or 21 whereby pin 26 may be locked against longitudinal movement. To prevent rotation of locking pin 26 and consequent release of locking lug 30 from groove 27 a spring-biased ball detent 28 is positioned within each support member 20, 21 and adapted to engage a hemi-spherical groove 29 on the circumference of pin 26. A stop 55 is located at the lower end of each support member 20, 21 to prevent complete withdrawal and separation therefrom of the pins 26. This prevents the locking pins from dropping out of the support members during mounting or dismounting of the gun.

As shown in Fig. 4, the rotatable muzzle mount 10 comprises a support ring 12 attached to a bulkhead 32 or other suitable structure by two diametrically opposite radially extending lugs 31 and having an annular flange 33 surrounding and extending longitudinally along the muzzle of the gun. The outer end portion of flange 33 is externally threaded for reception of an annular internally threaded bearing locking ring 34 which secures the outer ring of an anti-friction bearing 35 against internal shoulder 36 of support ring 31. Ring 12 is fastened to bulkhead 32 by nut and bolt assembly 37 through suitable apertures in lugs 31 or any other suitable means. The bearing 35 may be of a roller bearing, ball bearing, or other suitable type of heavy duty bearing capable of withstanding thrust loads in either direction, as well as radial loads.

The forward ends of the multiple barrels are rigidly joined together in an axially and circumferentially spaced relationship by means of an assembly 40 comprised of two circular plates 38, 39 apertured to snugly fit one over each of the enlarged annular longitudinally spaced shoulders formed near the muzzle of each barrel. Plates 38 and 39 are rigidly secured, as by welding, to the opposite ends of an axial clamping cylinder 52, concentrically positioned within the inner envelope of the multiple barrels. A handle 41 and a plate 42 for securely locking unit 40 to the barrels are axially bolted to the forward side of plate 38. Clamps such as thus described are known in the art and form no part of this invention as such.

Circular plate 38 has an annular edge portion of increased thickness with a longitudinally extending arcuate shaped edge 43 of the same radius as plate 38 and forming a spherical segment thereon. This arcuate surface has a sufficiently close dimensional fit with the inner surface 44 of the inner race of bearing 35 within which it rests that upon rotation of the multiple gun barrels the inner race of the bearing also rotates. However, the arcuate surface 43 allows relative longitudinal movement of the gun barrels due to firing recoil by permitting sliding movement between the arcuate surface 43 and inner race surface 44. The spherical edge 43 on plate 38 permits angular adjustment of the gun barrels without interfering with the muzzle supporting contact relationship between surface 43 and inner race surface 44, which transmits the rotational movement of the barrel to the anti-friction bearing.

A forwardly extending annular flange 46 on ring 12 projects through aperture 45 in the bulkhead 32. Spherical inner surface 47 of the flange 46 coacts with spherically ground annular ring 48, attached to the end of blast tube 49, to form a ball and socket type joint to allow for adjustment of the blast tube relative to the muzzle mount. The rearward end of blast tube 49 is adjustably secured within the ball and socket joint by threaded retainer ring 50 while the forward end of the blast tube is positioned within an outlet aperture 51 in the aircraft structure 54. After adjustment, a set screw (not shown) may be tightened to maintain the relative adjustment of the ball and socket joint.

Figs. 5 and 6 show a modified form of forward mount wherein the anti-friction bearing housing 60 is pivotally suspended on diametrically opposite trunnion pins 61 from member 62 which, in turn, is pivotally hung from fixed bracket 63 by means of hinge pin 72. Since both of the pivotal axes are in a parallel relation and transverse to the longitudinal axis of the gun, this arrangement permits a limited amount of longitudinal recoil movement of the barrels and the anti-friction bearing without relative movement between the barrels and the bearing inner race. This embodiment also illustrates a different type of muzzle clamping ring 64 which circumscribes the forward section of the multiple barrels between the shoulders thereon and which is rigidly secured to end plates 65, 66 fitted on the barrels. Ring 64 is secured in position by means of clamping plate 67 bolted thereto. The anti-friction bearing of this embodiment is secured in position by outer race retainer 68 and threaded retainer ring 69 while the inner race is secured by a retainer portion 70 formed integral with clamping ring 64 and threaded retainer ring 71.

The mounting arrangements set forth herein have no provision for adjustment. Therefore the gun will not be boresighted when installed in an airplane but the front and rear mounts will be made to position the gun with sufficient accuracy so that adjustment of the sight can be made to coordinate these two elements.

To dismount the gun, assuming that the hydraulic conduits, ammunition feed chute, and feed sprocket flexible drive shaft have been disconnected, rear mount locking pins 26 are turned to release the detent means and remove the locking lug 30 from groove 27 thereby permitting withdrawal of the locking pins from the apertured rod end of the recoil members 19. The gun may then be shifted rearwardly to free the muzzle plate 38 from the bearing and bearing housing. Installation is accomplished by reversing the steps outlined above.

Firing test dispersion patterns have clearly shown the vast improvement made in the accuracy of a rotating multiple-barrel-gun provided with the unique rotatable muzzle mount of this invention as compared with the optimum results obtainable by the same gun without such a rotating muzzle mount.

I claim:

1. In combination, a gun comprising a rotating barrel means including a plurality of barrels spaced about the longitudinal axis of said barrel means and a non-rotatable breech mechanism having attaching lugs, means operatively contacting said spaced barrels forming a coaxial cylindrical surface thereabout, cylindrical support means for attachment to suitable fixed structure concentrically about said cylindrical surface, bearing means for rotatably mounting the forward portion of said barrel means within said support means, and detachable means for fixedly supporting said non-rotatable breech mechanism, said coaxial cylindrical surface and said cylindrical support means forming a housing for said bearing means.

2. A combination, as in claim 1, wherein said detachable means for fixedly supporting said breech mechanism comprises a plurality of bifurcated members for receiving the breech mechanism lugs, each of said bifurcated members being attached to suitable adjacent supporting structure and having aligned apertures in the bifurcated elements thereof and each of said lugs having a hole therein in registry with the holes in one of said bifurcated elements, pin means for insertion through the aligned holes whereby the gun may be secured to said breech supporting means, and detent means for securing said pin means in its inserted position.

3. In combination, a breech loading gun of the type in which a series of barrels revolve around a common axis to fire in sequence in a predetermined position and including a non-rotatable breech portion, means for rotatably supporting said barrels at their muzzle ends in fixed relation to each other from adjacent fixed structure independent of the gun including an annular circumferential flange concentrically attached to and enclosing said barrels and a bearing supporting said flange, and detachable locking means for securing said non-rotatable breech portion to adjoining fixed structure.

4. A rotatable gun-barrel mount for a breech loading gun of the type in which a series of barrels revolve around a common axis to fire in sequence in a predetermined position comprising a housing means surrounding the forward portions of said barrels for attachment to suitable adjoining fixed supporting structure that is independent of the gun structure, a bearing means carried by said housing means and surrounding and rotatably supporting the forward portion of said gun barrels thereby preventing deflection and misalignment of said gun barrels, and means permitting angular adjustment of the barrels relative to said housing means.

5. A rotatable muzzle mount for a breech loading gun of the type in which a series of barrels revolve around a common axis to fire in sequence in a predetermined position comprising a support means for attachment to adjoining fixed supporting structure that is independent of the gun structure and having a bearing housing encircling the muzzles of said barrels, an anti-friction type bearing within said housing, said bearing having an inner and an outer race, and means attached to said gun barrels having an arcuate bearing surface for operatively contacting said inner bearing race whereby said inner race will be rotated upon rotation of said gun barrels.

6. In combination, a gun having a plurality of barrels spaced about a longitudinal axis and rotatable about said axis including a non-rotatable breech mechanism, a member attached to the forward portion of said barrels having a circumferential edge portion around said barrels, a housing means surrounding a portion of the forward end of said barrels for attachment to suitable adjoining fixed supporting structure, a bearing means surrounding the forward end of said gun barrels carried within said housing means and rotatably supporting said member, said member being slidably mounted within said bearing means thereby allowing axial and rotational movement of said gun barrels without deflection and misalignment of the same.

7. In combination a gun of the type in which a series of barrels revolve around a common axis to fire in sequence in a predetermined position and including a non-rotatable breech portion, a circular member rigidly mounted over said barrels and normal thereto having a portion concentric about said barrels and said common axis, a housing means surrounding a forward portion of said barrels for attachment to suitable adjacent fixed supporting structure, an anti-friction bearing having an inner and an outer race mounted in said housing circumscribing said gun barrels and rotatably supporting said circular member, said circular member being slidably mounted within said bearing for axial and rotational movement therein.

8. A combination as set forth in claim 7 wherein said circular member has an edge portion in sliding contact with the inner race of said bearing that is arcuately shaped in longitudinal cross section whereby the non-rotatable breech portion may be moved to adjust the gun barrel in elevation and azimuth without changing operative the gun barrel rotational mounting arrangement within said bearing and said housing.

9. A combination as set forth in claim 7 wherein said housing means further includes a forwardly projecting cylindrical portion having an interior segmental spherical surface adapted to allow insertion of the complementally shaped end of a gun blast tube to form an adjustable ball and socket joint therebetween.

10. A rotatable muzzle mount for a breech loading gun of the type in which a plurality of gun barrels revolve around a common axis to fire in sequence in a predetermined position comprising a generally cylindrical member having an annular radially extending flange attachable to suitable adjoining fixed structure, said member having an interior annular shulder therein forming a seat for a bearing, an anti-friction bearing having an inner and outer race seated within said member on said shoulder, a locking ring threadedly engaging said member and securing the outer race to said member, and a cylindrical means secured on said barrels and having peripheral portion operatively contacting the inner race of said bearing to thereby permit rotation of the attached gun barrels.

11. A rotatable muzzle mount for a breech loading gun as set forth in claim 10 wherein said generally cylindrical member has a forwardly extending portion with a segmental spherical surface adapted to form a ball and socket joint with the complementally formed end of a blast tube.

References Cited in the file of this patent

UNITED STATES PATENTS

| | | |
|---|---|---|
| 173,752 | Bailey | Feb. 22, 1876 |
| 1,328,230 | Johnston | Jan. 13, 1920 |
| 1,424,751 | Bangerter | Aug. 8, 1922 |
| 2,331,033 | La Porte | Oct. 5, 1943 |
| 2,366,072 | Tucker et al. | Dec. 26, 1944 |
| 2,703,509 | Forthofer | Mar. 8, 1955 |
| 2,737,085 | Peterson | Mar. 6, 1956 |
| 2,756,639 | Bird | July 31, 1956 |